(12) United States Patent
Furukawa et al.

(10) Patent No.: US 12,177,537 B2
(45) Date of Patent: Dec. 24, 2024

(54) PROGRAM PRODUCTION APPARATUS, PROGRAM PRODUCTION METHOD, AND RECORDING MEDIUM

(71) Applicant: BOND Co., Ltd., Kitakyushu (JP)

(72) Inventors: Hiromi Furukawa, Fukuoka (JP); Hiroyuki Sato, Fukuoka (JP); Ryuji Takase, Fukuoka (JP)

(73) Assignee: BOND Co., Ltd., Fukuoka (JP)

( * ) Notice: Subject to any disclaimer, the term of this patent is extended or adjusted under 35 U.S.C. 154(b) by 349 days.

(21) Appl. No.: 17/625,631

(22) PCT Filed: Aug. 27, 2020

(86) PCT No.: PCT/JP2020/032441
§ 371 (c)(1),
(2) Date: Jan. 7, 2022

(87) PCT Pub. No.: WO2021/039924
PCT Pub. Date: Mar. 4, 2021

(65) Prior Publication Data
US 2022/0264193 A1  Aug. 18, 2022

(30) Foreign Application Priority Data

Aug. 29, 2019 (JP) .................. 2019-157209
Jan. 29, 2020 (JP) .................. 2020-012558

(51) Int. Cl.
*H04N 21/854* (2011.01)
*H04N 21/2343* (2011.01)
*H04N 21/266* (2011.01)

(52) U.S. Cl.
CPC ..... *H04N 21/854* (2013.01); *H04N 21/23439* (2013.01); *H04N 21/266* (2013.01); *H04N 21/85406* (2013.01)

(58) Field of Classification Search
None
See application file for complete search history.

(56) References Cited

U.S. PATENT DOCUMENTS 6,362,855 B1    3/2002  Watanabe
2005/0012761 A1 1/2005  Shiomi et al.
(Continued)

FOREIGN PATENT DOCUMENTS

CN    101370077 A    2/2009
EP      1499124 A2    1/2005
(Continued)

OTHER PUBLICATIONS

Chinese Office Action (CNOA) dated Nov. 30, 2023 issued in Chinese application No. 202080031442.6 and its English machine translation.
(Continued)

*Primary Examiner* — Junior O Mendoza
(74) *Attorney, Agent, or Firm* — RANKIN, HILL & CLARK LLP

(57) ABSTRACT

A program production apparatus or the like that is suitable for reflecting information with respect to persons who distribute or broadcast programs as well as viewers. A program production apparatus 1 generates program data using a character. A performance determination unit 5 determines a performance using the character. A program production unit 7 generates the program data using the performance determined by the performance determination unit 5. The performance determination unit 5 adjusts movement of the character and/or adjusts at least one from among lines spoken by the character, BGM, and sound effects, according to the file format of the program data generated by the program production unit 7, so as to determine the performance.

9 Claims, 3 Drawing Sheets

(56) References Cited

U.S. PATENT DOCUMENTS

| | | | |
|---|---|---|---|
| 2005/0041159 A1 | 2/2005 | Nakamura et al. | |
| 2009/0184963 A1 | 7/2009 | Shiomi et al. | |
| 2011/0074815 A1 | 3/2011 | Shiomi et al. | |
| 2014/0002464 A1* | 1/2014 | Furukawa | G10L 21/10 345/474 |
| 2022/0279228 A1* | 9/2022 | Furukawa | H04N 5/93 |
| 2023/0343053 A1* | 10/2023 | Scapel | G06F 3/04842 |

FOREIGN PATENT DOCUMENTS

| | | | |
|---|---|---|---|
| JP | 11-252457 A | 9/1999 |
| JP | 2002300434 A | 10/2002 |
| JP | 2004120114 A | 4/2004 |
| JP | 2004343781 A | 12/2004 |
| JP | 2005-6229 A | 1/2005 |
| JP | 2005-39794 A | 2/2005 |
| JP | 2005210541 A | 8/2005 |
| JP | 2006005418 A | 1/2006 |
| JP | 2008-118468 A | 5/2008 |
| JP | 2009049456 A | 3/2009 |
| JP | 2009-171393 A | 7/2009 |
| JP | 2009159529 A | 7/2009 |
| JP | 4725918 B2 | 7/2011 |
| JP | 4725936 B1 | 7/2011 |
| JP | 2014233049 A | 12/2014 |
| JP | 2018-007010 A | 1/2018 |
| JP | 2018-7010 A | 1/2018 |

OTHER PUBLICATIONS

Chinese Office Action (CNOA) dated Feb. 23, 2024 for Chinese Patent Application No. 202080058140.8; English machine translation.

International Search Report (ISR) dated Sep. 24, 2020 filed in PCT/JP2020/032441.

* cited by examiner (a)

(b)

(a)

(b)

(c)

PROGRAM PRODUCTION APPARATUS, PROGRAM PRODUCTION METHOD, AND RECORDING MEDIUM

TECHNICAL FIELD

The present invention relates to a program production apparatus, a program production method, and a recording medium, and particularly, to a program production apparatus etc., that generates program data employing a character.

BACKGROUND ART

As disclosed in Patent documents 1 and 2 or the like, the present applicant has researched and developed a system for producing a program employing a character using information input by a creator.

CITATION LIST

Patent Literature

Patent Document 1

Japanese Patent No. 4,725,936

Patent Document 2

Japanese Patent No. 4,725,918

SUMMARY OF INVENTION

Technical Problem

However, the techniques disclosed in Patent documents 1 and 2 or the like have been developed without fully giving consideration to reflecting, in the program, information with respect to persons who distribute or broadcast programs (broadcasters, etc.) and viewers.

Accordingly, it is a purpose of the present invention to provide a program production apparatus or the like that is suitable for reflecting, in the program, information with respect to persons who distribute or broadcast programs and viewers.

Solution of Problem

A first aspect of the present invention relates to a program production apparatus configured to generate program data using a character. The program production apparatus includes: a performance determination unit configured to determine a performance using the character; and a program production unit configured to generate the program data using the performance. The performance determination unit adjusts a movement of the character and/or adjusts at least one from among lines spoken by the character, BGM, and sound effects, according to a file format of the program data.

A second aspect of the present invention relates to the program production apparatus according to the first aspect. When a creator makes an instruction to not make an adjustment according to the file format, the performance determination unit determines the performance common to a plurality of file formats. When the creator makes an instruction to make an adjustment according to a file format, the performance determination unit determines the performance by adjusting a movement of the character and/or at least one from among lines spoken by the character, BGM, and sound effects, according to a file format of the program data.

A third aspect of the present invention relates to the program production apparatus according to the second aspect. When a creator makes an instruction to not make an adjustment according to the file format, the program production unit uses the performance to generate first program data in a file format relating to an operating system of a computer that provides the program production apparatus. Furthermore, the first program data is converted so as to generate program data in a different file format.

A fourth aspect of the present invention relates to the program production apparatus according to the third aspect. When the program production unit converts the first program data so as to generate program data in a different file format, the program production unit adjusts a display of a caption in the first program data according to the file format after conversion.

A fifth aspect of the present invention relates to the program production apparatus according to the first aspect. The program production apparatus further includes a dynamic data processing unit configured to generate dynamic data. The program production unit generates third program data without using the dynamic data. The performance determination unit determines the performance using the dynamic data after the third program data is generated. The program production unit generates fourth program data using the dynamic data.

A sixth aspect of the present invention relates to a program production method configured to generate program data using a character. The program production method includes: performance determination in which a performance determination unit included in an information processing device determines a performance using the character; and program production in which a program production unit included in the information processing device generates the program data using the performance. In the performance determination, the performance determination unit determines the performance by adjusting a movement of the character and/or at least one from among lines spoken by the character, BGM, and sound effects, according to a file format of the program data.

A seventh aspect of the present invention relates to the program production method according to the sixth aspect. In the performance determination, when a creator makes an instruction to not make an adjustment according to the file format, the performance determination unit determines the performance common to a plurality of file formats. When the creator makes an instruction to make an adjustment according to a file format, the performance determination unit determines the performance by adjusting a movement of the character and/or at least one from among lines spoken by the character, BGM, and sound effects, according to a file format of the program data.

An eighth aspect of the present invention relates to the program production method according to the aspect 7. In the performance determination, when a creator makes an instruction to not make an adjustment according to the file format, the program production unit uses the performance to generate first program data in a file format relating to an operating system of a computer that provides the program production apparatus. The first program data is converted so as to generate program data in a different file format.

A ninth aspect of the present invention relates to the program production method according to the eighth aspect. When the program production unit converts the first program data so as to generate program data in a different file format, the program production unit adjusts a display of a caption in the first program data according to the file format after conversion.

A tenth aspect of the present invention relates to the program production method according to the aspect 7. The information processing device includes a dynamic data processing unit configured to generate dynamic data. The program production method includes: first performance determination in which the performance determination unit determines a performance using the character without using the dynamic data; first program production in which the program production unit generates the third program data using the performance; second performance determination in which the performance determination unit uses the dynamic data to determine a performance using the character; and second program production in which the program production unit generates the fourth program data using the performance.

An eleventh aspect of the present invention relates a computer-readable recording medium configured to record a program for operating a computer so as to function as the program production apparatus according to the first aspect 1.

It should be noted that the present invention may be regarded as a program production apparatus including a program production unit configured to generate program data, and a dynamic data processing unit configured to generate dynamic data, wherein the program production unit generates third program data without using the dynamic data, and the performance determination unit generates fourth program data using the dynamic data after the third program data is generated. Also, the present invention may be regarded as a program production method or the like for the program production apparatus.

Advantageous Effects of Invention

The present applicant has focused attention on the fact that the file format of the program data reflects an environment in which the program is distributed or broadcasted or an environment in which viewers view the program. With each aspect of the present invention, this is capable of appropriately determining the performance using the character according to the file format of the program data.

Furthermore, in a case in which the program is to be broadcasted on TV, the program data is required to conform to a standard determined beforehand. With the present invention, this is capable of generating the program data according to the file format of the program data. For example, this is capable of generating a moving image so as to allow it to be distributed via the Internet while simultaneously providing live broadcasting of the program on TV.

DESCRIPTION OF EMBODIMENTS

Description will be made below with reference to the drawings regarding an example of the present invention. It should be noted that the present invention is not restricted to such an example.

EXAMPLES

Figure 1:
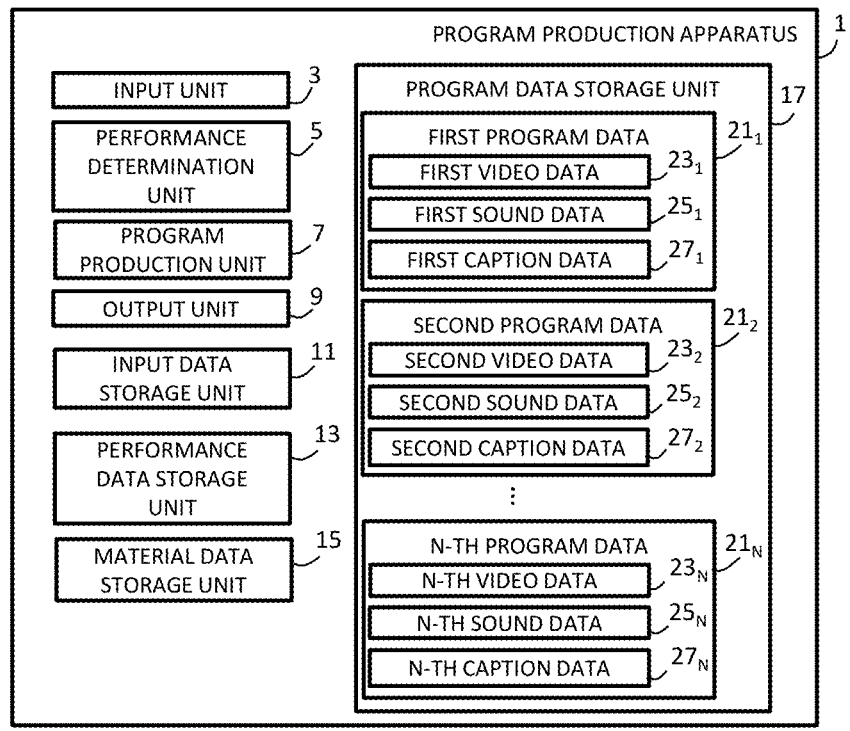
FIG. 1A is a block diagram showing an example configuration of a program production apparatus 1 according to an embodiment of the present invention.
FIG. 1B is a flowchart showing an example of the operation thereof.
Figure 1:
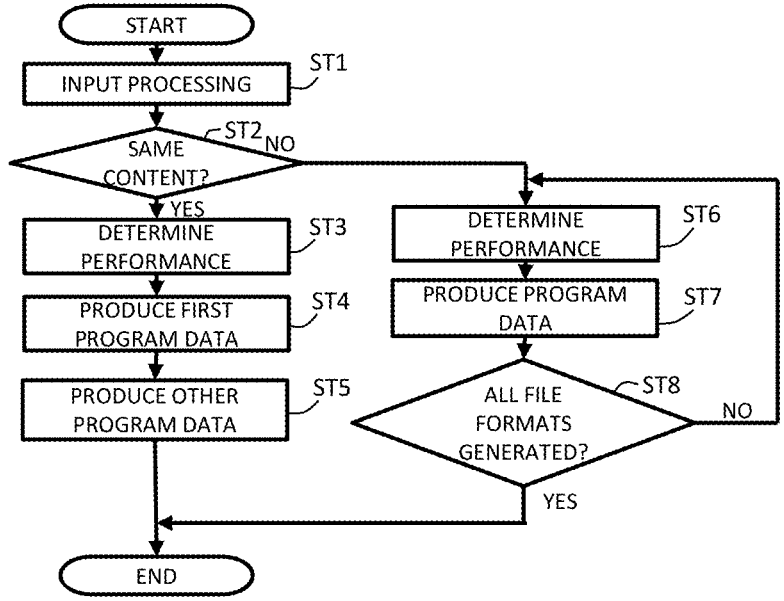

FIG. 1 shows (a) a block diagram showing an example configuration of a program production apparatus 1 according to an embodiment of the present invention and (b) a flow chart showing an example of the operation thereof.

The program production apparatus 1 includes an input unit 3, a performance determination unit 5 (an example of a "performance determination unit" in the appended claims), a program production unit 7 (an example of a "program production unit" in the appended claims), an output unit 9, an input data storage unit 11, a performance data storage unit 13, a material data storage unit 15, and a program data storage unit 17.

The input unit 3 allows the creator to input the input data. The input data storage unit 11 stores the input data. The input data includes program production data for producing a program and output specification data with respect to a file format of the program data to be output.

The performance data storage unit 13 stores the performance data to be used by the performance determination unit 5 to determine the performance. For example, the performance data includes information for analyzing emotion information with respect to a character or the like in the program production data (specification of lines spoken by or movement of the character, information with respect to material to be presented together with the character, etc.), information for specifying movement of the character for expressing a particular emotion (facial expression, gesture, etc.), information for specifying the shape of the mouth when the character speaks lines to express a particular emotion, information with respect to intonation when the character speaks lines to express a particular emotion, information with respect to the effects or the like of background music (BGM) or sounds to express a particular emotion, etc.

The performance determination unit 5 analyzes the information with respect to emotion to be expressed with reference to the performance data using the information input by the program creator, so as to determine the performance of movements of and lines spoken by the character, BGM, sound effects, or the like (see Patent document 1 or the like). It should be noted that the performance may include lighting, camera position, etc.

The material data storage unit 15 stores material data to be used by the program production unit 7 to generate program data. The material data includes information for specifying the shape of the character, voice information to be used for speaking lines, sound information with respect to the BGM, sound effects, etc., for example.

The program production unit 7 generates program data according to the performance determined by the performance determination unit 5 using the material data stored in the material data storage unit 15. The program data storage unit 17 stores the program data generated by the program production unit 7 (see Patent document 1 or the like).

The output unit 9 distributes the program data stored in the program data storage unit 17 to information processing terminals (smartphones or the like) used by viewers via the Internet, or broadcasts the program data to TV via a broadcaster so as to display the program data for viewers.

In this example, the program data is generated as moving image data, and includes at least video data, sound data, and caption data. The video data is configured as data for specifying an image to be displayed over time. The sound data is configured as data for specifying sound to be played back over time. The caption data is configured as data for specifying captions to be displayed together with the video data.

In the present example, the program data storage unit 17 stores N (N represents an integer of 2 or more) items of program data in different respective file formats. The program data in the n-th file format (n represents an integer from 1 to N) will be referred to as the "n-th program data". The n-th program data $21_n$ includes the n-th video data $23_n$, the n-th sound data $25_n$, and the n-th caption data $27_n$. Description will be made below regarding an example in which N=3.

The first program data $21_1$ is configured as program data relating to an operating system (OS) of a computer that provides the program production apparatus 1. For example, in a case in which the operating system (OS) is Windows (trademark), the first program data $21_1$ is configured in a Windows media format or the like. It can be anticipated that the processing for generating the program data in such a file format can be provided in a simple manner on a PC with Windows as its OS.

The second program data is configured in a file format such as the MP4 video file format or the like, for example, which is generally used to distribute program data via the Internet. Typically, in order to reduce the file size, the second program data is configured to have a reduced amount of information as compared with the first program data.

The third program data is configured in a file format that conforms to the standards defined for each industry. For example, the third program is configured as program data in the MXF file format employed in the broadcasting industry. In the MXF file format, various kinds of specifications are defined. For example, the sound volume range is determined such that there is not a large difference in the sound volume between programs. Also, the caption display region is determined so as to allow captions to be appropriately displayed on TV or the like. Such specifications are not determined in either the first program data or the second program data.

Typically, the first program data and the second program data each have no restrictions due to standards. Accordingly, after the first program data suitable for the OS is generated, the first program data thus generated is converted into the second program data, thereby obtaining the first program data and the second program data.

In contrast, in a case in which the third program data is used for broadcasting on TV, for example, the generation of the third program data requires a change of the sound volume, a change of the caption display method, etc., such that they meet the MXF file format standard. Typically, simple conversion is insufficient to generate the third program data, and changes are made manually so as to meet the standards. As a result, even after the generation of the first program data, in actuality, it has been difficult to convert the first program data into the third program data to be used in live broadcasting on TV.

It is conceivable that, after the third program data is generated, the third program data is converted into the first program data and the second program data. However, the MXF file format has its own restrictions for sound, captions, etc. This leads to the first program data and the second program data having unnecessary restrictions.

The present inventor has focused attention on the fact that the file format of the program data relates to the distribution/broadcasting environment or the environment in which viewers view the program data. For example, it is conceivable that there is a large difference in the speed at which a presenter speaks between a TV program and an environment in which a presenter speaks in front of an audience, i.e., on a stage or the like. Similarly, in a case in which program data suitable for viewing on the Internet is played back on TV as it is, there is a high probability that contemporary viewers will view the program data with a sensation of discomfort. In the present example, the program production unit 7 generates the program data using the performance determined by the performance determination unit 5 giving consideration to the file format of the program data to be generated. This allows the program data to be generated such that it reflects the viewer's viewing environment while reducing the work of broadcasters, etc.

It should be noted that, in some cases, depending on the program, it is preferable to allow the same content as that of the program data distributed via the Internet to be viewed on TV or the like, as in a case of simultaneous distribution and broadcasting. In order to support such a function, the present example is configured to allow the creator to instruct the program production apparatus 1 to generate program data having common content in multiple file formats. In this case, the program production unit 7 generates program data having common content while satisfying restrictions required by the respective file formats.

Description will be made with reference to FIG. 1B regarding an example of the operation of the program production apparatus 1 shown in FIG. 1A.

First, the creator inputs the program production data and the output specification data using the input unit 3 (Step ST1). In order to make a specific description, description will be made regarding an example in which the program data is generated for instructing the character to speak the line "Thank you for always being nice to me", and for displaying a caption thereof. Description will be made assuming that the output specification data is generated as an instruction to generate program data in the MP4 video file format and in the MXF file format. Description will be made regarding a case in which the creator specifies the generation of program data having common content and a case in which the creator does not make such a specification.

The program production unit 7 judges whether or not the output specification data specifies the generation of program data having common content (Step ST2).

Description will be made regarding a case in which the output specification data specifies the generation of program data having common content. In this case, judgement of "YES" is made in Step ST2.

The performance determination unit 5 determines a performance that is common to the multiple file formats (Step ST3). For example, first, the line "Thank you for always being nice to me" is analyzed. From the part "always", the performance determination unit 5 extracts repetition or the fact of an ongoing human relationship. From the part "thank you", the performance determination unit 5 extracts a positive emotion such as gratitude. The performance determination unit 5 determines that the character speaks the line "Thank you for always being nice to me" while executing movement so as to express "gratitude based on an ongoing relationship of trust" as a performance using a character. Furthermore, the performance determination unit 5 determines BGM and sound effects that are appropriate for the performance.

The program production unit 7 generates the first program data $21_1$ according to the performance determined by the performance determination unit 5 (Step ST4). Specifically, based on the first video data $23_1$, the character is moved according to a performance that expresses "gratitude based on an ongoing relationship of trust". Furthermore, based on the first sound data $25_1$, the sound of the line "Thank you for always being nice to me" and BGM or sound effects are played back so as to express "gratitude based on an ongoing relationship of trust". In addition, based on the first caption data $27_1$, the caption "Thank you for always being nice to me" is displayed.

The program production unit 7 converts the first program data $21_1$ into the second program data $21_2$ and the third program data $21_3$ (Step ST5). The first program data $21_1$ can be converted into the second program data $21_2$ by typical file format conversion. In the processing for conversion into the third program data $21_3$, the file format conversion is performed so as to meet a standard. For example, the sound volume of the first sound data $25_1$ is adjusted so as to generate the third sound data $25_3$. Furthermore, the display position at which the first caption data $27_1$ is to be displayed is adjusted so as to generate the third caption data $27_3$. This allows the first program data $21_1$, the second program data $21_2$, and the third program data $21_3$ to have content using a common performance.

It should be noted that the program data may be generated in multiple file formats based on the same performance. In this case, multiple items of program data may be generated in parallel.

Description will be made regarding a case in which the output specification data does not specify the generation of program data having common content. In this case, judgement of "NO" is made in Step ST2.

The performance determination unit 5 determines the performance for the second program data (Step ST6). From the line "Thank you for always being nice to me", "ongoing relationship of trust" and "emotion of gratitude" are extracted. The second program data is used for distribution via the Internet. In this case, in a case in which the viewer views the program on a smartphone, for example, there is a probability that the viewer will not continuously view the screen due to being in an environment in which the viewer is moving. In this situation, auditory information is important. Furthermore, visual information is preferably configured such that the most important emotion to be communicated will be recognized if only a part of the program is viewed. Accordingly, it can be understood that it is effective for the character to strongly and continuously express a positive emotion such as "gratitude" or the like to be transmitted via movement and lines. Accordingly, the performance determination unit 5 expresses the emotion "gratitude" in addition to the phase "always" using the movement and lines provided by the character, BGM, sound effects, etc. In contrast, the "relationship of trust" is expressed as an auxiliary performance.

The program production unit 7 generates the first video data $23_1$, the first sound data $25_1$, and the first caption data $27_1$ according to the performance determined by the performance determination unit 5, thereby generating the first program data $21_1$. The program production unit 7 converts the first video data $23_1$, the first sound data $25_1$, and the first caption data $27_1$ of the first program data $21_1$, so as to generate the second video data $23_2$, the second sound data $25_2$, and the second caption data $27_2$ of the second program data $21_2$, thereby generating the second program data $21_2$ (Step ST7).

The program production unit 7 judges whether or not the program data has been generated in all the file formats (Step ST8). When judgement has been made that the program data has been generated in all the file formats, the processing ends. When there is any file format that has not been generated, the flow returns to Step ST6.

In this case, the third program data $21_3$ has not been generated. Accordingly, judgment of "NO" is made, and the flow returns to Step ST6.

The performance determination unit 5 determines the performance for the third program data (Step ST6). From the line "Thank you for always being nice to me", "ongoing relationship of trust" and "emotion of gratitude" are extracted. The third program data $21_3$ is used for TV broadcasting, for example. In this case, the viewer is in an environment in which the viewer continuously views the program. Accordingly, there is a high probability that the viewer will grasp the visual information as a whole. In this case, the character is able to express "gratitude" after confirming a "relationship of trust" with the viewer. Accordingly, it is effective for the character to say "always" so as to produce a sincere and honest atmosphere, and to say "thank you" to express the positive emotion "gratitude" in a polite manner. Accordingly, the performance determination unit 5 determines the performance so as to express the relationship of trust at the phase of "always", and to strongly express "gratitude" at the phase of "thank you" using the movement and lines provided by the character, BGM, sound effects, etc.

The program production unit 7 generates the first video data $23_1$, the first sound data $25_1$, and the first caption data $27_1$ such that they meet the standard of the third program data $21_3$ according to the performance determined by the performance determination unit 5, thereby generating the first program data $21_1$. The program production unit 7 converts the first video data $23_1$, the first sound data $25_1$, and the first caption data $27_1$ of the first program data $21_1$, so as to generate the third video data $23_3$, the third sound data $25_3$, and the third caption data $27_3$ of the third program data $21_3$, thereby generating the third program data $21_3$ (Step ST7).

The program production unit 7 judges whether or not the program data has been generated in all the file formats (Step ST8). In this case, judgement has been made that the program data has been generated in all the file formats. Accordingly, the processing ends.

It should be noted that, for example, the program data storage unit 17 may be configured to store the same program data generated in the same file format with different compression rates as different program data. Description has been made with reference to FIG. 1 regarding an example in which the second program data $21_2$ and the third program data $21_3$ are sequentially generated. Also, the multiple items of program data may be generated in parallel.

Figure 2:
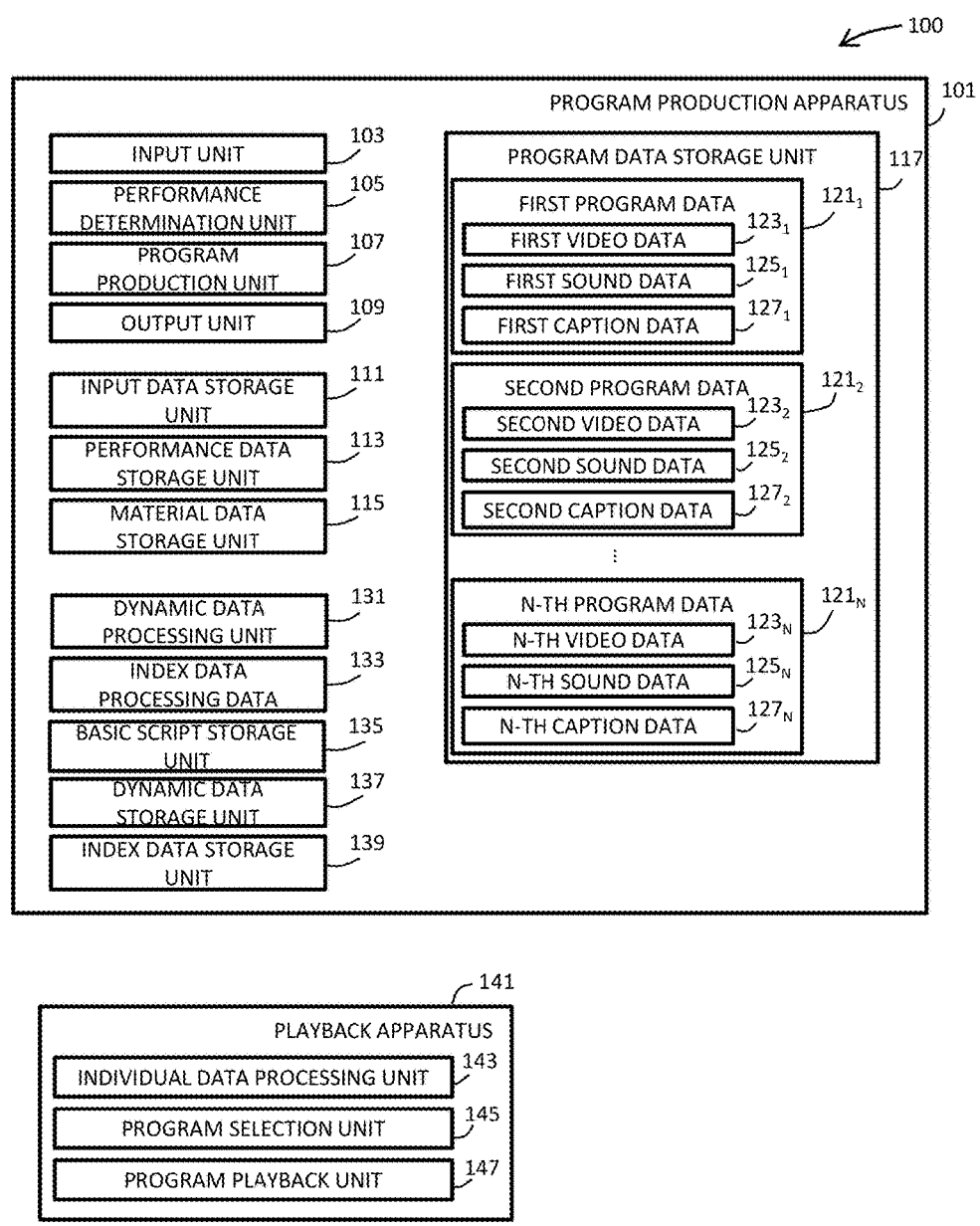
FIG. 2 is a block diagram showing an example configuration of a program production system according to another embodiment of the present invention.
Figure 3:
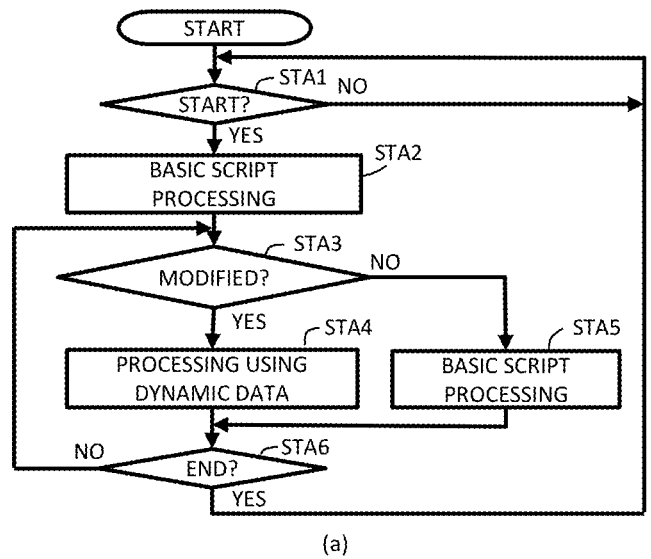
FIG. 3 is a block diagram showing an example configuration of a program production system according to yet another embodiment of the present invention.
Figure 3:
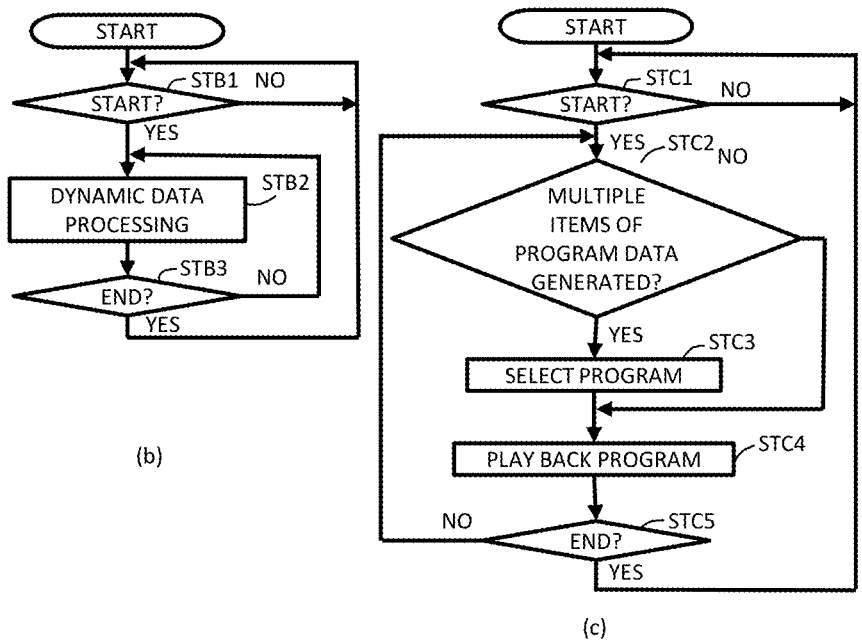

FIGS. 2 and 3 are block diagrams showing an example configuration of the program production system according to another embodiment of the present invention and a flowchart showing an example of the operation thereof.

Referring to FIG. 2, the program production system 100 includes a program production apparatus 101 and a playback apparatus 141. The program production apparatus 101 and the playback apparatus 141 are configured such that they can communicate with each other using the Internet or the like.

The program production apparatus 101 includes an input unit 103, a performance determination unit 105, a program production unit 107, an output unit 109, an input data storage unit 111, a performance data storage unit 113, a material data storage unit 115, and a program data storage unit 117. In principle, the input unit 103, the performance determination unit 105, the program production unit 107, the output unit 109, the input data storage unit 111, the performance data storage unit 113, the material data storage unit 115, and the program data storage unit 117 are the same as the input unit 3, the performance determination unit 5, the program production unit 7, the output unit 9, the input data storage unit 11, the performance data storage unit 13, the material data storage unit 15, and the program data storage unit 17, respectively. Description will be made below regarding different components.

The program production apparatus 101 further includes a dynamic data processing unit 131, an index data processing unit 133, a basic script storage unit 135, a dynamic data storage unit 137, and an index data storage unit 139.

The playback apparatus 141 includes an individual data processing unit 143, a program selection unit 145, and a program playback unit 147.

The basic script storage unit 135 stores a basic script.

The material data storage unit 115 stores data to be used for generating a program. Examples of such material data include: sound data or video data recorded beforehand; sound data for generating sound effects, BGM, or the like; and sound data and video data collected at the same time as the generation of a program in a case of providing live broadcasting, live streaming, or the like. The program production unit 107 manages material data. For example, in a case of providing live broadcasting, live streaming, or the like, the program production unit 107 collects the sound data recorded by a recording device at the same time as the generation of the program, and instructs the material data storage unit 115 to store the sound data thus acquired.

Before the program production unit 107 starts processing for generating the next program, the dynamic data processing unit 131 collects information required for generating the next program, so as to generate dynamic data. Here, the dynamic data may be generated based on newly collected information, for example. Also, in order to generate the dynamic data, the dynamic data generated based on the previously collected information may be updated based on the newly collected information. The dynamic data storage unit 137 stores the dynamic data.

The program production unit 107 generates the program by executing necessary processing such as emotion analysis or the like using the basic script, the material data, and the dynamic data, and generates the program data for specifying the program thus generated. The program data storage unit 117 stores the program data generated by the program production unit 107.

When the program production unit 107 generates multiple items of program data, the index data processing unit 133 generates index data that indicates the features of each item of program data. The index data storage unit 139 stores the index data.

The output unit 109 transmits the program data to the playback apparatus 141.

In the playback apparatus 141, the individual data processing unit 143 generates individual data that corresponds to the usage environment of the playback apparatus 141. The individual data is used to specify the area in which the playback apparatus 141 is located using GPS or the like, to specify topics that attract a high degree of interest of the user of the playback apparatus 141 based on the conversation of the user of the playback apparatus 141, as well as instructions specified by the user. The dynamic data processing unit 131 may collect individual data so as to generate the dynamic data.

When there are multiple items of the program data, the program selection unit 145 selects the program data to be played back using the index data and the individual data.

The program playback unit 147 receives the program data from the output unit 109, and plays back the program specified by the program data. For example, in a case in which the playback apparatus 141 is configured as a device that plays back sound (e.g., an artificial intelligence (AI) speaker or the like), the sound specified by the program data is played back. For example, in a case in which the playback apparatus 141 is configured as a device that plays back video and sound (e.g., a TV or the like), the program playback apparatus 147 plays back the sound and video specified by the program data.

Description will be made with reference to FIG. 3A regarding an example of the processing for generating the program data executed by the program production unit 21. The program production unit 107 stands by before the generation of the program (Step STA1).

When a program is to be generated (when judgment of "YES" has been made in Step STA1), the program production unit 107 generates a program using a part of or all of the basic script without using the dynamic data, and generates program data for specifying the program thus generated (Step STA2). Specifically, the program is generated according to the processing shown in FIG. 1B, for example. In this stage, the dynamic data processing unit 25 generates the dynamic data in parallel in step STB2. The program data storage unit 19 stores the program data thus generated.

The program producing unit 21 judges whether or not the dynamic data is to be used (Step STA3).

When judgement has been made that the dynamic data is to be used, the program production unit 107 generates a program using a part of or all of the basic script and the dynamic data, and generates the program data for specifying the program thus generated (Step STA4). Specifically, the program is generated according to the processing shown in FIG. 1B, for example. The program data storage unit 117 stores the program data thus generated. When multiple items of program data have been generated, the index data processing unit 135 generates index data that indicates the features of each program thus generated. The index data storage unit 139 stores the index data. Subsequently, the flow proceeds to Step STA6.

When judgment has been made that the dynamic data is not to be used, the program production unit 107 generates a program using a part of or all of the basic script without the dynamic data, and generates the program data for specifying the program thus generated (Step STA4). The program data storage unit 19 stores the program data thus generated. Subsequently, the flow proceeds to Step STA6.

In Step STA6, judgment is made with regard to whether or not the processing for generating the program has been completed. When the processing has been completed, the flow returns to Step STA1. Otherwise, the flow returns to Step STA3.

Description will be made with reference to FIG. 3B regarding an example of the processing for generating the dynamic data executed by the dynamic data processing unit 131. The dynamic data processing unit 131 stands by before the processing for generating the program is started (Step STB1). When the processing for generating the program is started ("YES" in Step STB1), the dynamic data processing unit 131 generates the dynamic data (Step STB2). The dynamic data storage unit 137 stores the dynamic data thus generated. The dynamic data processing unit 131 judges whether or not the processing for generating the program has been completed (Step STB3). When judgement has been made that the processing has been completed, the flow returns to Step STB1. Otherwise, the flow returns to Step STB2.

Description will be made with reference to FIG. 3C regarding an example of the operation of the playback apparatus 141. The individual data processing unit 143 continuously manages individual data. The program playback unit 35 stands by before the processing for playing back the program is started (Step STC1). When the processing for playing back the program is to be started ("YES" in Step STC1), the program playback unit 147 judges whether or not the number of items of program data is plural (Step STC2). When judgment has been made that a single item of program data has been generated, the flow proceeds to Step STC4. When the number of items of program data is plural, the program selection unit 145 selects the program data to be played back from the multiple items of program data thus generated using the individual data and the index data (Step STC3), following which the flow proceeds to Step STC4. In Step STC4, the program playback unit 147 receives the program data to be played back from the output unit 109, and plays back the program. The program playback unit 147 judges whether or not the processing for playing back the program has been completed (Step STC5). When the processing has been completed, the flow returns to Step STC1. Otherwise, the processing returns to Step STC2.

With the system shown in FIGS. 2 and 3, this is capable of providing live broadcasting during a disaster, for example. When disaster information is provided, typically, there is information of common interest to many viewers and listeners. For example, where a disaster has occurred and what kind of disaster it is are matters of common interest. In contrast, there is a difference among viewers and listeners in their level of interest regarding information about a disaster that has not occurred in their local area. For example, in Japan, typhoons travel from west to east. Accordingly, when a typhoon approaches the Kyushu region, which is in the west, for typical viewers and listeners residing in the Kanto region, which is in the east, they have an interest in information regarding whether or not the typhoon will approach the Kanto region rather than information regarding whether or not a disaster has occurred due to the typhoon. Also, it is anticipated that viewers and listeners will be able to predict damage that will occur when the typhoon approaches the Kanto region based on damage that is occurring in the Kyushu region. Such information is of common interest to many viewers and listeners. Empirically, the ratio of information of common interest is estimated to be on the order of 70%. In contrast, in a case in which a person has an acquaintance in the Kyushu region, it is anticipated that the person would be interested in whether or not a disaster has occurred in an area in which the acquaintance resides. With this example, this is capable of supporting a topic of individual interest based on the dynamic data while transmitting information of common interest based on the basic script.

REFERENCE SIGNS LIST 1 program production apparatus, 3 input unit, 5 performance determination unit, 7 program production unit, 9 output unit, 11 input data storage unit, 13 performance data storage unit, 15 material data storage unit, 17 program data storage unit, $21_n$ n-th program data, $23_n$ n-th video data, $25_n$ n-th sound data, $27_n$ n-th caption data, 100 program production system, 101 program production apparatus, 3 input unit, 5 performance determination unit, 7 program production unit, 9 output unit, 11 input data storage unit, 13 production data storage unit, 15 material data storage unit, 17 program data storage unit, $21_n$ n-th program data, $23_n$ n-th video data, $25_n$ n-th sound data, $27_n$ n-th caption data.

The invention claimed is:

1. A program production apparatus configured to generate program data using a character, the program production apparatus comprising:
   a performance determination unit configured to determine a performance using the character; and
   a program production unit configured to generate the program data using the performance,
   wherein the performance determination unit adjusts a movement of the character and/or adjusts at least one from among lines spoken by the character, BGM, and sound effects, according to a file format of the program data,
   wherein when a creator makes an instruction to not make an adjustment according to the file format, the performance determination unit determines the performance common to a plurality of file formats, and
   wherein, when a creator makes an instruction to make an adjustment according to a file format, the performance determination unit determines the performance by adjusting a movement of the character and/or at least one from among lines spoken by the character, BGM, and sound effects, according to a file format of the program data.

2. The program production apparatus according to claim 1, wherein, when a creator makes an instruction to not make an adjustment according to the file format, the program production unit uses the performance to generate first program data in a file format relating to an operating system of a computer that provides the program production apparatus, and wherein the first program data is converted so as to generate program data in a different file format.

3. The program production apparatus according to claim 2, wherein, when the program production unit converts the first program data so as to generate program data in a different file format, the program production unit adjusts a display of a caption in the first program data according to the file format after conversion.

4. The program production apparatus according to claim 1, further comprising a dynamic data processing unit configured to generate dynamic data,
   wherein the program production unit generates third program data without using the dynamic data,
   wherein the performance determination unit determines the performance using the dynamic data after the third program data is generated,
   and wherein the program production unit generates fourth program data using the dynamic data.

5. A non-transitory computer-readable recording medium configured to record a program for operating a computer so as to function as the program production apparatus according to claim 1.

6. A program production method configured to generate program data using a character, the program production method comprising:
   performance determination in which a performance determination unit included in an information processing device determines a performance using the character; and
   program production in which a program production unit included in the information processing device generates the program data using the performance, wherein, in the performance determination, the performance determination unit determines the performance by adjusting a movement of the character and/or at least one from among lines spoken by the character, BGM, and sound effects, according to a file format of the program data, wherein, in the performance determination, when a creator makes an instruction to not make an adjustment according to the file format, the performance determination unit determines the performance common to a plurality of file formats, and wherein, when a creator makes an instruction to make an adjustment according to a file format, the performance determination unit determines the performance by adjusting a movement of the character and/or at least one from among lines spoken by the character, BGM, and sound effects, according to a file format of the program data.

7. The program production method according to claim 6, wherein, in the performance determination, when a creator makes an instruction to not make an adjustment according to the file format, the program production unit uses the performance to generate first program data in a file format relating to an operating system of a computer that provides the program production apparatus, and wherein the first program data is converted so as to generate program data in a different file format.

8. The program production method according to claim 7, wherein, when the program production unit converts the first program data so as to generate program data in a different file format, the program production unit adjusts a display of a caption in the first program data according to the file format after conversion.

9. The program production method according to claim 6, wherein the information processing device comprises a dynamic data processing unit configured to generate dynamic data, and wherein the program production method comprises:

first performance determination in which the performance determination unit determines a performance using the character without using the dynamic data;

first program production in which the program production unit generates the third program data using the performance;

second performance determination in which the performance determination unit uses the dynamic data to determine a performance using the character; and second program production in which the program production unit generates the fourth program data using the performance.

* * * * *